June 12, 1951  J. R. REYBURN  2,556,741
SNAP HOOK
Filed July 6, 1946
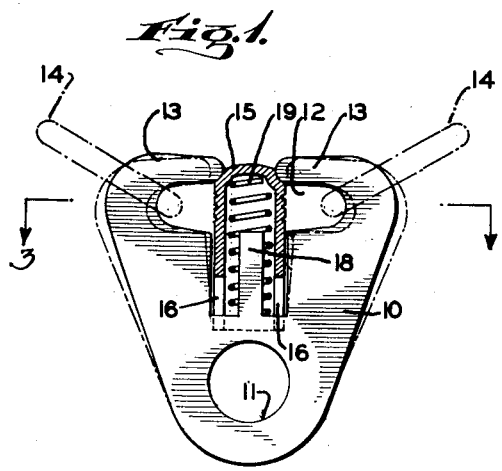
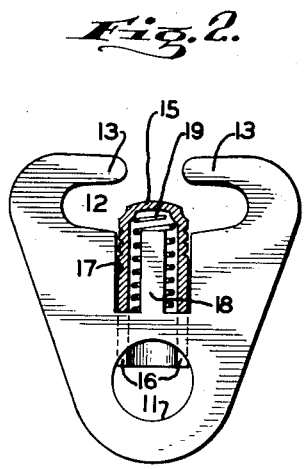
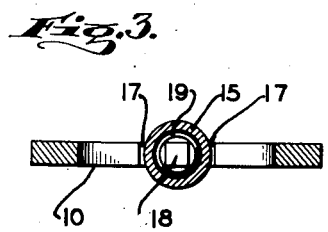
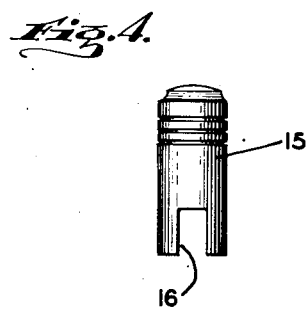
INVENTOR
JOHN R. REYBURN
BY
Frederick P. Duncan, ATTORNEY Patented June 12, 1951

2,556,741

UNITED STATES PATENT OFFICE 2,556,741

SNAP HOOK

John R. Reyburn, Fairfield, Conn., assignor to American Chain & Cable Company, Inc., Bridgeport, Conn., a corporation of New York Application July 6, 1946, Serial No. 681,742

1 Claim. (Cl. 24—73)

This invention relates to fastening devices utilized to secure dog collars, necklaces, and the like.

Dog collars made of twisted link chain have been found very satisfactory because of their sanitary nature and great strength, as well as the neat appearance of such chain. However, the various devices available for fastening the ends of the collar together, or for fastening a dog tag and leash to the chain, are ordinarily clumsy and unsatisfactory and sometimes injure the dog if he scratches or is very active in the woods.

It is therefore an object of the present invention to provide an improved fastener for a dog collar or the like with a neat appearance and so made as to be impossible for a dog to open accidentally, and which will not have projections or such bulk as to injure the dog.

Referring now to the drawings:

Fig. 1 is an elevation, with some parts in section, of an embodiment of the present invention;

Fig. 2 is a view similar to Fig. 1, with the parts in position to release the collar;

Fig. 3 is a section taken on line 3—3 of Fig. 1; and

Fig. 4 is a detail of one of the parts of the device.

The device consists of three parts: a flat plate-like member, a sleeve, and a spring. The plate-like member 10 is formed with an opening 11 to receive a leash swivel hook or license tag link, and with a cut-out portion 12 defining two hooks 13 with a gap between them for the insertion of the end links 14 of the chain, shown in dot and dash lines in Fig. 1.

A sleeve 15 is assembled with the plate 10 to normally close this gap. As shown, it has a diameter greater than the width of the gap and may have a concave upper perimeter to match with the contour of the hooks. The sleeve 15 is further furnished with a pair of longitudinal slots 16, which extend partially up from the bottom and are wide enough to permit entry of the plate.

In order to position and guide the sleeve 15, slots 17 are cut in the plate 10, defining a post 18. If the outer walls of the slots engage the sleeve with sufficient clearance to permit sliding movement, they will cooperate with the slots 16 in the sleeve 15 to prevent any but a reciprocatory motion of the sleeve, which is what is desired.

A compression spring 19 engages the top interior of the sleeve and rests on the bottom of the slots 17 and serves to urge the sleeve upwardly into the position shown in Fig. 1. This effectively closes the gap and prevents displacement of the end rings 14.

As the diameter of the sleeve is greater than the gap between the hooks in the finished product, it is necessary to arrive at the final form by deformation of some part. Any type of deformation, such as bending the hooks or the pillar 18, can be utilized, but the method shown is the preferred one, as it involves a minimum of operations. The plate 10 is formed as shown in the dot and dash lines of Fig. 1, when initially blanked out in the press. This differs from the finished form in that the sides of the plate are further apart, and the gap between the hooks 13 is sufficient to permit the insertion of the spring and sleeve. After they are in place, the sides of the plate are forced together in a press, thus retaining the sleeve and producing the article illustrated.

It is to be understood that the above description is intended to be illustrative rather than limitative, and that the scope of this invention is to be understood from the appended claim.

I claim:

A connector comprising a member having portions defining a pair of opposed hooks with a gap between the ends thereof and a pair of parallel slots defining a pillar, a sleeve mounted in telescoping relation around said pillar to close said gap in one position, said sleeve having a pair of slots extending longitudinally from one end to a point intermediate the ends, the slots in the sleeve slidingly embracing the member at the bottom of the slots in the member, and the sleeve slidingly engaging the outer sides of the slots in the member to be guided thereby, and a compression spring around said pillar and within said sleeve engaging the bottoms of the slots in the member yieldingly urging said sleeve into gap closing position.

JOHN R. REYBURN.

REFERENCES CITED

The following references are of record in the file of this patent:

UNITED STATES PATENTS

| Number | Name | Date |
|---|---|---|
| 64,174 | Watson | Apr. 23, 1867 |
| 300,065 | Gibbons | June 10, 1884 |
| 311,941 | Armstrong | Feb. 10, 1885 |
| 321,080 | Blanchard | June 30, 1885 |
| 593,023 | Kelly | Nov. 2, 1897 |
| 649,460 | Jordan | May 15, 1900 |
| 828,823 | Maise | Aug. 14, 1906 |
| 890,698 | Olson | June 16, 1908 |
| 1,060,736 | Bayer | May 6, 1913 |
| 1,696,077 | Dean | Dec. 18, 1928 |

FOREIGN PATENTS

| Number | Country | Date |
|---|---|---|
| 91,563 | Austria | Mar. 10, 1923 |